May 19, 1970

MICHIO TOKUNAGA 3,513,401

CIRCUIT ARRANGEMENTS EMPLOYING ACTIVE ELEMENTS THEREIN FUNCTIONING AS CIRCULATORS, GYRATORS, INDUCTORS OR FILTERS

Filed March 31, 1967

2 Sheets-Sheet 1

INVENTOR
MICHIO TOKUNAGA

BY Paul M. Craig, Jr.
ATTORNEY

INVENTOR
MICHIO TOKUNAGA

BY Paul M. Craig, Jr.
ATTORNEY

United States Patent Office 3,513,401

Patented May 19, 1970

3,513,401

CIRCUIT ARRANGEMENTS EMPLOYING ACTIVE ELEMENTS THEREIN FUNCTIONING AS CIRCULATORS, GYRATORS, INDUCTORS OR FILTERS

Michio Tokunaga, Yokohama, Japan, assignor to Hitachi, Ltd., Tokyo, Japan, a corporation of Japan Filed Mar. 31, 1967, Ser. No. 627,333
Claims priority, application Japan, Apr. 15, 1966, 41/23,558
Int. Cl. H03h 7/44
U.S. Cl. 328—167 5 Claims

ABSTRACT OF THE DISCLOSURE

An ideal circulator having three polarity-inversion type of amplifiers connected in a ring-like cascade fashion and a source of constant current supply connected between a common terminal of these amplifiers and the ground. The circulator is combined with capacitance elements to provide a circuit element such as an inductance, a gyrator, low pass filter, band pass filter or high pass filter.

This invention relates to electronic circuits employing active elements therein which function as various circuits such as circulators, gyrators, inductors or filters.

It is already well known in the art that a circulator theoretically is one special form of passive elements and can generally be expressed by an admittance matrix or Y-matrix in a multi-terminal pair network. For the purpose of easy understanding of this invention, however, the circulator is represented by a three terminal pair network which has an admittance matrix. The matrix is generally expressed in terms of equivalent admittance elements Y*ij* (*i*, *j*=1, 2, 3) as shown on the left-hand of the following formula, and as is known by those skilled in the art, especially, the circulator is specified by a three terminal pair network which has an admittance matrix as shown on the right hand of the formula by letting G represent the gyrating admittance. The relation of these matrixes is:

$$\begin{bmatrix} Y_{11} & Y_{12} & Y_{13} \\ Y_{21} & Y_{22} & Y_{23} \\ Y_{31} & Y_{32} & Y_{33} \end{bmatrix} = \begin{bmatrix} O & -G & G \\ G & O & -G \\ -G & G & O \end{bmatrix} \quad (1)$$

where Y*ij* (*i*=*j*; 1, 2, 3) represent the input admittances when looking into the network input terminals, *i*, *j* with the remaining terminal pairs being short-circuited, called short-circuit driving point admittances, while Y*ij* (*i*=*j*; 1, 2, 3) represent the mutual conductances between the *i* and *j* terminal pairs when the network is driven from the *j* terminal pair side, called short-circuit transfer admittances. Now, it is also theoretically known that in the admittance matrix of a circular network, Y*ij* (*i*=*j*; 1, 2, 3)=0, and $Yij=-Yji$.

However, a practical device having the properties of an ideal circulator has been neither found nor put into practical use yet and there has been a demand for the ideal circulator of the kind described.

It is the primary object of the present invention to provide a circulator of the kind described.

In accordance with the present invention, such a circulator can be obtained by connecting in a ring-like fashion three polarity-inversion type amplifiers employing active elements therein and by interposing a constant current source between the ground and a common junction point of these three amplifiers.

Another object of the invention is to provide various circuits obtainable by application of such ideal circulator.

Figure 1:
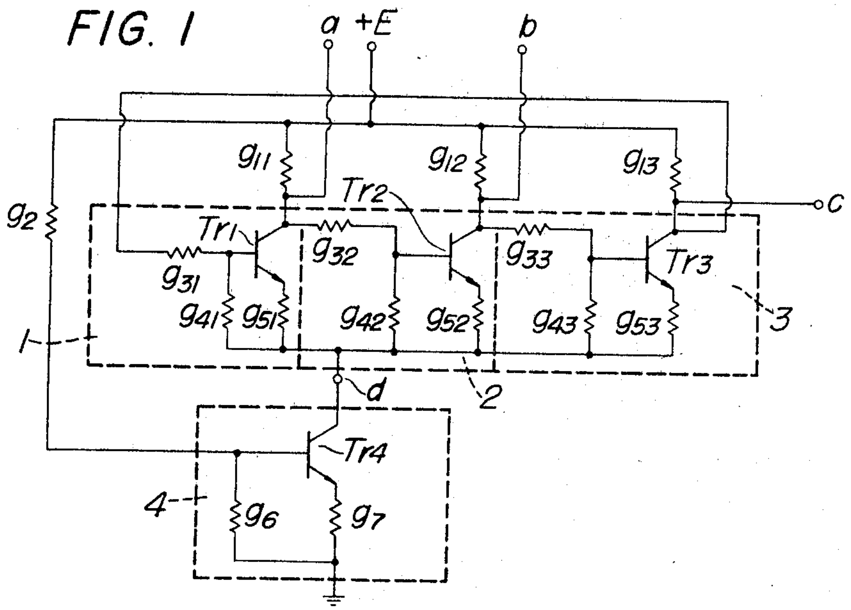
FIG. 1 is a circuit diagram of a circulator embodying the present invention.

Referring first to FIG. 1, the basic principle of the circulator according to the invention will be described. The circulator includes therein polarity-inversion type amplifiers 1, 2 and 3 formed from transistor T*r*1, T*r*2 and T*r*3 and operative to invert the polarity of the output with respect to that of the input, a constant current source 4 containing therein a transistor T*r*4, terminals *a*, *b*, *c*, *d*, and admittance elements $g_1$ to $g_7$. Amplifiers 1, 2 and 3 are connected in the form of a ring-like cascade connection through the admittance elements $g_{31}$ $g_{32}$ and $g_{33}$.

The constant current source 4 in this circuit is operative to apply a suitable biasing current to the polarity-inversion type of amplifiers 1, 2 and 3 and to provide an infinitely large impedance between the ground and the common terminal *d* of these polarity-inversion type amplifiers 1 to 3. When now the terminal *c* is connected to the ground, a signal applied to the terminal *a* is transmitted to the transistor T*r*2 through an admittance $g_{32}$ so that it is thereby amplified and inverted in its polarity to appear at the terminal *b*.

Conversely, a signal applied to the terminal *b* is passed through admittances $g_{33}$, $g_{43}$ and $g_{51}$ to be applied to the emitter of the transistor T*r*1 whereby it is amplified but not inverted in its polarity to appear at the terminal *a*. In other words, the elements $Y_{21}$ and $Y_{12}$ in the aforementioned Formula 1 take a positive value and a negative value, respectively, and the absolute values of these elements $Y_{21}$ and $Y_{12}$ can be made equal as will be described later.

Further, in case the terminal *b* is additionally grounded, a signal applied to the terminal *a* is passed through the emitter of transistor T*r*2, admittance $g_{52}$, terminal *d* and admittance $g_{51}$ to be applied to the emitter of transisor T*r*1 whereby it is amplified and fed back to the terminal *a*. Since this path forms a positive feedback loop, the input impedance as viewed from the terminal *a* takes the form of a negative resistance of short-circuit stabilizing type. Therefore, the input impedance as viewed from the terminal *a* can be made infinitely great by suitably selecting the values of an admittance $g_{11}$ and the negative resistance described above. In other words, the element $Y_{11}$ in the aforementioned Formula 1 can be made zero.

Similarly it is possible to have an infinitely great input impedance as viewed from the terminal *b* with the terminal *a* short-circuited to the ground. Operation similar to the case in which the terminal *c* is solely short-circuited to the ground can likewise be obtained for a circuit between the terminals *b* and *c* with the terminal *a* short-circuited to the ground. In this manner, it is possible to constitute an ideal circulator satisfying the Formula 1 by suitably selecting the constants in the circuit shown in FIG. 1.

Figure 2:
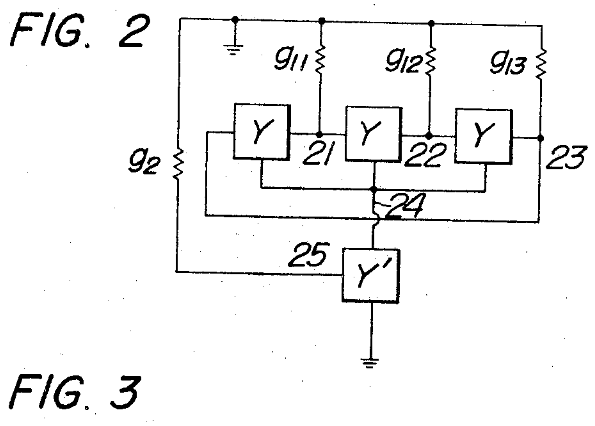
FIG. 2 is a circuit diagram showing an arrangement of a more general form of the circulator according to the invention.

In the next description, quantitative analysis will be given in order to verify the capability of constituting the circulator represented by the Formula 1 on the basis of a general configuration shown in FIG. 2. In FIG. 2, polarity-inversion type amplifiers corresponding to the amplifiers 1 to 3 in FIG. 1 are designated by reference characters Y, and it is assumed that these amplifiers Y have the same characteristics and their Y matrix is given by $$\begin{bmatrix} Y_{11} & 0 \\ Y_{21} & Y_{22} \end{bmatrix} \qquad (2)$$

Reference character Y′ in FIG. 2 designates a source of constant current supply and its Y matrix is supposed to be given by $$\begin{bmatrix} Y_{11}' & 0 \\ Y_{21}' & Y_{22}' \end{bmatrix} \qquad (3)$$

Suppose now that admittances $g_{11}$, $g_{12}$ and $g_{13}$ in the circuit of FIG. 2 have a relation $g_{11}=g_{12}=g_{13}$ and hence are represented by $g_{11}=g_{12}=g_{13}=g_1$. Then, a circuit matrix including the admittances $g_1$ and $g_2$ is given by the following formula:

$$\begin{bmatrix} g_1+Y_{11} & 0 & Y_{21} & -(g_1+Y_{11}+Y_{21}) & 0 \\ Y_{21} & g_1+Y_{11} & 0 & -(g_1+Y_{11}+Y_{21}) & 0 \\ 0 & Y_{21} & g_1+Y_{11} & -(g_1+Y_{11}+Y_{21}) & 0 \\ -(g_1+Y_{11}+Y_{21}) & -(g_1+Y_{11}+Y_{21}) & -(g_1+Y_{11}+Y_{21}) & 3(g_1+Y_{11}+Y_{21}) & Y_{21}' \\ 0 & 0 & 0 & 0 & g_2+Y_{11}' \end{bmatrix} \qquad (4)$$

An equivalent admittance matrix with respect to terminals 21, 22 and 23 in FIG. 2 can be derived from the above Formula 4 as follows:

$$\begin{bmatrix} g_1+Y_{11}-\frac{g_1+Y_{11}+Y_{21}}{3} & -\frac{g_1+Y_{11}+Y_{21}}{3} & Y_{21}-\frac{g_1+Y_{11}+Y_{21}}{3} \\ Y_{21}-\frac{g_1+Y_{11}+Y_{21}}{3} & g_1+Y_{11}-\frac{g_1+Y_{11}+Y_{21}}{3} & -\frac{g_1+Y_{11}+Y_{21}}{3} \\ -\frac{g_1+Y_{11}+Y_{21}}{3} & Y_{21}-\frac{g_1+Y_{11}+Y_{21}}{3} & g_1+Y_{11}-\frac{g_1+Y_{11}+Y_{21}}{3} \end{bmatrix} \qquad (5)$$

In order that the above Formula 5 equals the aforementioned Formula 1, the following conditions must be satisfied:

$$\left.\begin{aligned} g_1+Y_{11}-\frac{g_1+Y_{11}+Y_{21}}{3}&=0 \\ \frac{g_1+Y_{11}+Y_{21}}{3}&=G \\ Y_{21}-\frac{g_1+Y_{11}+Y_{21}}{3}&=G \end{aligned}\right\} \qquad (6)$$

Thus, the conditions requested for the polarity-inversion type amplifiers are $$\left.\begin{aligned} Y_{21}&=2G \\ Y_{11}&=G-g_1 \end{aligned}\right\} \qquad (7)$$

When the polarity-inversion type amplifier is replaced by a transistor of grounded emitter configuration, the equivalent current amplification factor $\beta_o$ (with grounded emitter) and the equivalent grounded-base short-circuit input impedance $h_{11b}$ of this transistor must have the following relation in view of the above Formulas 7:

$$\left.\begin{aligned} g_1&=\frac{G}{\beta_o}(\beta_o-2) \\ h_{11b}&=\frac{\beta_o}{2(1+\beta_o)G} \end{aligned}\right\} \qquad (8)$$

Now, the equivalent current amplification factor $\beta_o$ and the equivalent grounded-base short-circuit input impedance $h_{11b}$ for the circuit including the polarity-invention type of amplifiers 1 to 3 shown in FIG. 1 will be sought by use of the above formulas. Then, the admittance matrix for such circuit is given by $$\begin{bmatrix} g_3 & -g_3 & 0 & 0 \\ -g_3 & g_3+g_4+Y_{11} & -Y_{11} & 0 \\ 0 & -(Y_{11}+Y_{21}) & Y_{11}+Y_{21}+g_5 & 0 \\ 0 & Y_{21} & -Y_{21} & 0 \end{bmatrix} \qquad (9)$$

where it is supposed that the transistors T*r*1, T*r*2 and T*r*3 have their Y parameters which are $$Y_{11}=\frac{1}{h_{11b}(1+\beta_o)}$$

and $Y_{21}$, while $g_{11}=g_{12}=g_{13}=g_1$, $g_{31}=g_{32}=g_{33}=g_3$, $g_{41}=g_{42}=g_{43}=g_4$, and $g_{51}=g_{52}=g_{53}=g_5$.

Therefore, the equivalent current amplification factor $\beta_o$ and the equivalent grounded-base short-circuit input impedance $h_{11b}$ can be given by $$\left.\begin{aligned} \beta_o&=g_5/g_4 \\ h_{11b}&=\frac{g_3+g_4}{(1+\beta_o)g_3g_4} \end{aligned}\right\} \qquad (10)$$

and there are also relations that $g_5/h_{11b}<<1$ and $g_5Y_{11}/g_4Y_{21}<<1$. Thus, the admittances $g_1$, $g_2$ and $g_4$ can be sought from the following formulas:

$$\left.\begin{aligned} g_1&=\frac{G(\beta_o-2)}{\beta_o} \\ \frac{1}{g_2}&=\frac{\beta_o}{2G}\left\{1-2G\left(\frac{1}{g_5}+h_{11b}\right)\right\} \\ \frac{1}{g_4}&=\beta_o\left(\frac{1}{g_5}+h_{11b}\right) \end{aligned}\right\} \qquad (11)$$

Figure 3:
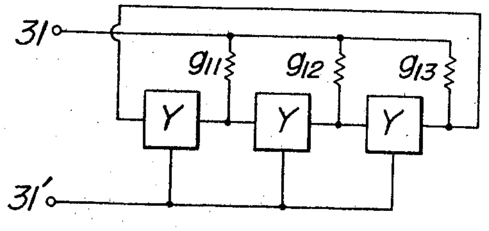
FIG. 3 is a circuit diagram showing an arrangement of that portion of the circuit of FIG. 2 which forms an effective D.C. resistance between a power supply and a constant current source.

The biasing condition will next be considered. The current value of the source of constant current supply 4 shown in FIG. 1 is given by $$I_o \doteqdot \frac{g_7g_2E}{g_2+g_6} \qquad (12)$$

and the equivalent resistance across terminals 31 and 31′ shown in FIG. 3 is expressed by $$\text{Rin} \doteqdot \frac{1}{2G\left(1+\frac{1}{\beta_o}\right)\left(1-\frac{2}{\beta_o}\right)} \qquad (13)$$

Therefore, the following condition must be satisfied in order that the source of constant current supply 4 should properly operate:

$$E-\frac{g_2g_7E}{g_2+g_6}\left\{\frac{1}{g_7}+\frac{1}{2G\left(1+\frac{1}{\beta_o}\right)\left(1-\frac{2}{\beta_o}\right)}\right\}>0 \qquad (14)$$

It will thus be understood that the circuit shown in FIG. 1 can function as an ideal circulator represented by the Formula 1 when circuit constants are suitably selected to satisfy both the Formulas 11 and 14. Further, as will be apparent from the Formula 11, this circuit has a notable feature that it is not appreciably affected by variations of the transistor constants.

Preferred applications of the circulator having the configuration as described above will next be described in detail hereunder.

Figure 4:
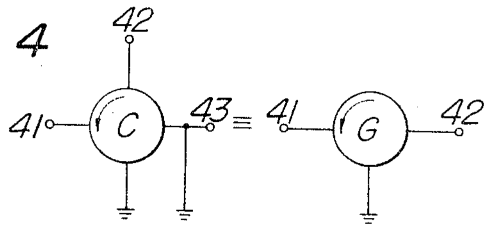
FIG. 4 is a schematic diagram showing a manner of connection when the circulator according to the invention is used as a gyrator.
Figure 5:
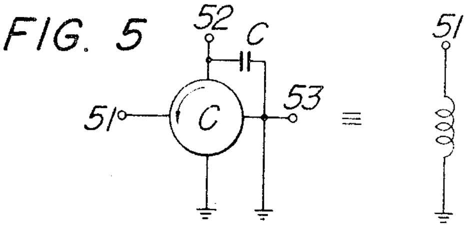
FIG. 5 is a schematic diagram of an inductance formed from the circulator according to the invention whose one terminal is grounded.

As shown in FIG. 4, one terminal, for example, a terminal 43 of the circulator may be short-circuited, that is, any one of the terminals *a*, *b* and *c* in the circuit shown in FIG. 1 may be short-circuited to the ground through a capacitor of large capacity. This short-circuiting will extinguish the *i*-th row and *i*-th column of the matrix represented by the Formula 1 and eventually an ideal gyrator can be obtained. In gyrator thus formed, a capacitor C may be connected between a terminal 52 and the ground as shown in FIG. 5. According to such an arrangement, the equivalent input impedance as viewed from a terminal 51 will provide an inductance having one terminal thereof grounded.

Figure 6:
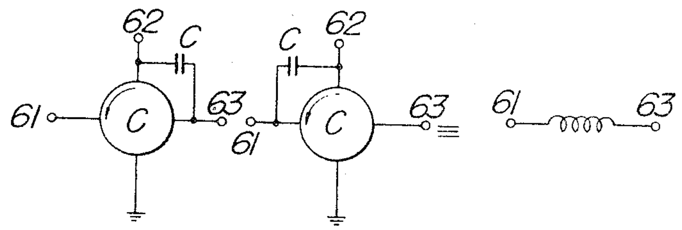
FIG. 6 is a schematic diagram of an inductance formed from the circulator according to the invention which is isolated from the ground.

Further as shown in FIG. 6, a capacitor C may be connected between any two terminals, for example, terminals 62 and 63 of the circulator. In such an arrangement, the admittance matrix is given by $$\begin{bmatrix} O & -G & G \\ G & PC & -G-PC \\ -G & G-PC & PC \end{bmatrix} \qquad (15)$$

where $PC=j\omega C$ (J gives $\sqrt{-1}$ and $\omega$ the angular frequency of an input signal and the Y matrix in terms of an equivalent four terminal network between the terminals 61 and 63 is given by $$\begin{bmatrix} \frac{G^2}{PC} & -\frac{G^2}{PC} \\ -\frac{G^2}{PC} & \frac{G^2}{PC} \end{bmatrix} \qquad (16)$$

thus providing an inductance isolated from the ground.

Figure 7:
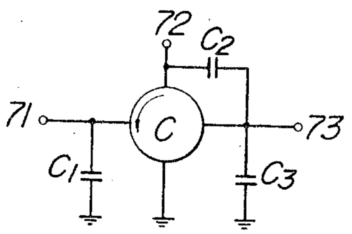
FIG. 7 is a schematic diagram of a low pass filter employing the circulator according to the invention.

A low pass filter may be obtained by connecting a capacitor $C_2$ between terminals 72 and 73 of the circulator to form an inductance and by connecting capacitors $C_1$ and $C_3$ between the respective terminals 71 and 73 and the ground as shown in FIG. 7.

Figure 8:
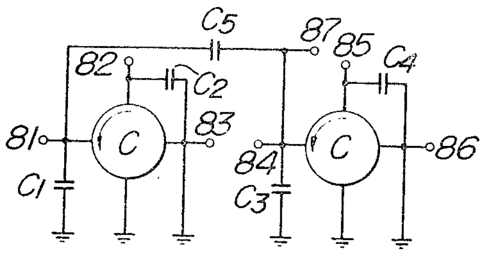
FIG. 8 is a schematic diagram of a band pass filter employing the circulator according to the invention.

A band pass filter may be obtained by arranging in a manner as shown in FIG. 8. In FIG. 8 it will be seen that two gyrators according to the invention are connected together and capacitors $C_2$ and $C_4$ are connected between terminals 82 and 83 of one gyrator and terminals 85 and 86 of the other gyrator to form inductances, while capacitors $C_1$ and $C_3$ are connected between respective input terminals 81 and 84 of the gyrators and the ground, and a capacitor $C_5$ is connected between these input terminals 81 and 84. It will be readily understood that removal of the capacitors $C_1$ and $C_3$ from the above circuit provides a high pass filter.

From the foregoing description, it will be appreciated that an ideal circulator can be easily formed according to the invention from a direct-coupled transistor amplifier, and such circulator does not require the provision of resistances of large value, is driven from a single power supply of constant current and is not substantially affected by the parameters of the transistors. Such circulator may be easily incorporated in integrated circuits, and mere addition of a capacitor or capacitors to the circulator visualizes the formation of an equivalent inductance. The invention is thus advantageous in that various filters can be formed without any use of inductance elements.

I claim:

1. A circuit employing active elements therein comprising at least three polarity-inversion type amplifiers connected in the form of a ring-like cascade connection, each amplifier having an input terminal, output terminal and common reference terminal, said input terminal being in common with the output terminal of the preceding amplifier, and constant current source means interposed between the common reference terminal and the ground.

2. A circuit according to claim 1, in which said input and output terminals are provided to constitute a circulator.

3. A circuit according to claim 1, in which a capacitor is connected between two output terminals of said amplifiers to provide an inductance isolated from the ground.

4. A circuit according to claim 1, in which the output terminal of one of said amplifiers is short-circuited to the ground to provide a gyrator.

5. A circuit according to claim 1, in which one of said two output terminals having said capacitor connected therebetween is connected to the ground through a capacitor, and the remaining output terminal is also connected to the ground through another capacitor to provide a filter circuit.

References Cited

UNITED STATES PATENTS

| | | | |
|---|---|---|---|
| 2,794,864 | 6/1957 | Schockley | 330—6 |
| 2,885,492 | 5/1959 | d'Heedene | 179—170 |
| 2,954,529 | 9/1960 | Offner. | |
| 3,001,157 | 9/1961 | Sipress et al. | |
| 3,173,098 | 3/1965 | Peretz. | |
| 3,300,738 | 1/1967 | Schlicke | 333—24.1 |
| 3,397,363 | 8/1968 | Dias | 331—8 |

KATHLEEN H. CLAFFY, Primary Examiner

W. A. HELVESTINE, Assistant Examiner

U.S. Cl. X.R.

307—295; 330—12; 333—1.1, 80